(12) United States Patent  (10) Patent No.: US 9,308,926 B2
King  (45) Date of Patent: Apr. 12, 2016

(54) POSITION CONTROL SYSTEM

(75) Inventor: Steven Morris King, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 1900 days.

(21) Appl. No.: 12/344,633

(22) Filed: Dec. 29, 2008

(65) Prior Publication Data

US 2010/0168940 A1  Jul. 1, 2010

(51) Int. Cl.
| | | |
|---|---|---|
| *G06F 7/00* | (2006.01) | |
| *B61L 25/02* | (2006.01) | |
| *A63G 7/00* | (2006.01) | |
| *B60L 3/10* | (2006.01) | |
| *B61C 15/12* | (2006.01) | |

(52) U.S. Cl.
CPC ............... *B61L 25/021* (2013.01); *A63G 7/00* (2013.01); *B60L 3/10* (2013.01); *B61C 15/12* (2013.01); *B60L 2200/26* (2013.01); *Y02T 10/7258* (2013.01); *Y02T 90/16* (2013.01)

(58) Field of Classification Search
CPC ....... B61L 25/00; B61L 25/02; B61L 25/021; B61L 3/10; B61L 220/26; B61C 15/08; B61C 15/12
USPC ........... 701/96, 205, 300, 116, 82, 71, 74, 70; 104/299; 180/197; 246/168.1
See application file for complete search history.

(56) References Cited

U.S. PATENT DOCUMENTS

| | | | | |
|---|---|---|---|---|
| 4,498,016 A | * | 2/1985 | Earleson et al. ............ | 290/40 R |
| 4,864,306 A | | 9/1989 | Wiita | |
| 5,197,562 A | * | 3/1993 | Kakinami .......... | B60K 31/0008 180/169 |
| 5,305,693 A | * | 4/1994 | Johnson et al. ................ | 104/299 |
| 5,473,225 A | * | 12/1995 | Miyazaki ........................ | 318/52 |
| 5,495,251 A | * | 2/1996 | Gilling ............... | B60K 31/0008 180/167 |
| 5,533,695 A | | 7/1996 | Heggestad et al. | |
| 5,595,121 A | * | 1/1997 | Elliott et al. .................... | 104/53 |
| 5,689,422 A | * | 11/1997 | Heymann et al. ............... | 701/93 |
| 6,148,269 A | * | 11/2000 | Kumar et al. ................... | 702/96 |
| 6,285,944 B1 | * | 9/2001 | Tange .................... | B60K 28/16 180/167 |
| 6,295,487 B1 | * | 9/2001 | Ono et al. ....................... | 701/22 |

(Continued)

FOREIGN PATENT DOCUMENTS

| | | |
|---|---|---|
| CN | 1134559 A | 10/1996 |
| CN | 1137993 A | 12/1996 |

(Continued)

OTHER PUBLICATIONS

Office Action for Japanese Patent Application No. 2011543531 issued Nov. 25, 2013.

*Primary Examiner* — Thomas G Black
*Assistant Examiner* — Sara Lewandroski
(74) *Attorney, Agent, or Firm* — Fletcher Yoder, P.C.

(57) ABSTRACT

A method for determining slippage of at least one wheel of at least one vehicle having a motor and a processor that communicates velocity commands to the motor for varying a velocity of the vehicle is presented. The method includes determining an actual velocity of the vehicle over regular intervals; comparing, over regular intervals, the actual velocity of the vehicle to the expected velocity from the magnitude of the velocity commands to determine whether there is slip of the wheel of the vehicle; and reducing the magnitude of the velocity commands to equal approximately the actual velocity of the vehicle where there is slip of the wheel. A system and circuit carrying out the method are also presented.

15 Claims, 4 Drawing Sheets

(56) References Cited

U.S. PATENT DOCUMENTS

| | | | |
|---|---|---|---|
| 6,420,996 B1 * | 7/2002 | Stopczynski | G01S 13/765 340/435 |
| 6,526,346 B2 * | 2/2003 | Ishizu | B60K 31/0008 180/169 |
| 6,532,411 B2 * | 3/2003 | Manaka | B60T 7/22 303/155 |
| 6,587,763 B2 | 7/2003 | Ishikawa | |
| 6,600,987 B2 * | 7/2003 | Ohtsu | B60T 8/173 303/155 |
| 6,666,411 B1 | 12/2003 | Hart | |
| 6,691,014 B2 * | 2/2004 | Reich et al. | 701/70 |
| 6,853,902 B2 * | 2/2005 | Miller | B60T 7/22 180/167 |
| 7,084,602 B2 * | 8/2006 | Donnelly et al. | 318/807 |
| 7,182,298 B2 | 2/2007 | Fischer | |
| 7,286,934 B2 * | 10/2007 | Gaegauf et al. | 701/301 |
| 7,451,034 B2 * | 11/2008 | Deur | B60T 8/175 701/82 |
| 7,739,023 B2 * | 6/2010 | Lee | B60T 7/22 123/350 |
| 2004/0181320 A1 | 9/2004 | Kane et al. | |
| 2009/0114114 A1 * | 5/2009 | Rose et al. | 104/53 |

FOREIGN PATENT DOCUMENTS

| | | | |
|---|---|---|---|
| DE | 19509696 A1 * | 9/1996 | |
| DE | 10209378 A1 | 9/2003 | |
| EP | 1302382 A2 * | 4/2003 | |
| JP | 63249405 | 10/1988 | |
| JP | 04251502 | 9/1992 | |
| JP | 07170603 | 7/1995 | |
| JP | 09140009 A | 5/1997 | |
| JP | 2008289237 | 5/2007 | |
| WO | 2004024531 A1 | 3/2004 | |
| WO | 2009032382 A2 | 3/2009 | |
| WO | WO 2009032382 A2 * | 3/2009 | |

* cited by examiner

POSITION CONTROL SYSTEM

BACKGROUND OF THE INVENTION

The present invention relates to position control systems. More specifically, the present invention relates to position control systems for vehicles on a fixed path.

Currently, the monitoring of vehicle motion along a path, such as a railway or a track, is carried out using a central controller or computer. The computer monitors each vehicle's position on the track and when vehicle spacing is within a predetermined minimum distance, all vehicles on the track are stopped. Such a system, in addition to the computer, includes multiple sensors mounted at various locations along the track and complex wiring for connecting each sensor and the computer.

For example, U.S. Pat. No. 4,864,306 describes a system in which machine readable trackside markers such as bar code markers are utilized along the track and are read by apparatus on board the train to provide track number identification, milepost identification and train direction. On board the train is equipment to provide train identification and train speed. This information is transmitted through transponders between trains and to a central station and is processed by apparatus on board the respective trains and the central location to provide visual and audible signals indicative of a potential train collision.

More recently, U.S. Pat. No. 7,182,298 describes a track network incorporating at least one node at which at least two track sections of the track network adjoin one another and also comprising a plurality of vehicles traveling along the track network and each of which comprises a control unit wherein the control of the movements of these vehicles can be effected and wherein the information relating to the successor or the forerunner vehicle is stored in the control unit of the vehicle and is updated when the vehicle passes a node of the track network.

However, because of the necessary computer, complex wiring, and multiple sensors, the system is difficult to integrate and to costly to maintain. Other disadvantages include the requirement to test and prove system functionality after track installation, the technical challenge of aligning a sensor and target for the vehicle to track interface, the inability to sense a spacing problem until it has become sufficiently severe to violate the minimum spacing, the inability to change spacing criteria without adding additional sensors which makes the system less flexible, and the inability to account for horizontal wheel slip and wheel and tire breakdown.

Therefore, to date, no suitable method or system for position control for a vehicle on a fixed track exists.

BRIEF DESCRIPTION OF THE INVENTION

In one embodiment of the present invention, a method for controlling a plurality of vehicles each having wheels located on a fixed path is presented. The method comprising: mounting a processor on each vehicle; mounting a vehicle sensor device to each vehicle; using each processor and each vehicle sensor device to determine an actual velocity of each vehicle while each vehicle is moving along the path; and using a position control correction module to compare each vehicle's actual velocity to each vehicle's velocity commands to determine if wheel slip is occurring and to decrease the magnitude of vehicle velocity commands where wheel slip occurs.

In another aspect of the invention, a method for determining slippage of at least one wheel of at least one vehicle having a motor and a processor that communicates velocity commands to the motor for varying a velocity of the vehicle is presented. The method comprising determining an actual velocity of the vehicle over regular intervals; comparing, over regular intervals, the actual velocity of the vehicle to the expected velocity from the magnitude of the velocity commands to determine whether there is slip of the wheel of the vehicle; and reducing the magnitude of the velocity commands to equal approximately the actual velocity of the vehicle where there is slip of the wheel.

BRIEF DESCRIPTION OF THE DRAWINGS

The following detailed description is made with reference to the accompanying drawings, in which.

DETAILED DESCRIPTION OF THE PREFERRED EMBODIMENT

One embodiment of the present invention concerns a control system and method for controlling a plurality of vehicles on a fixed path. One particular embodiment of the system includes a position control and correction module for correcting spacing between vehicles.

Figure 1:
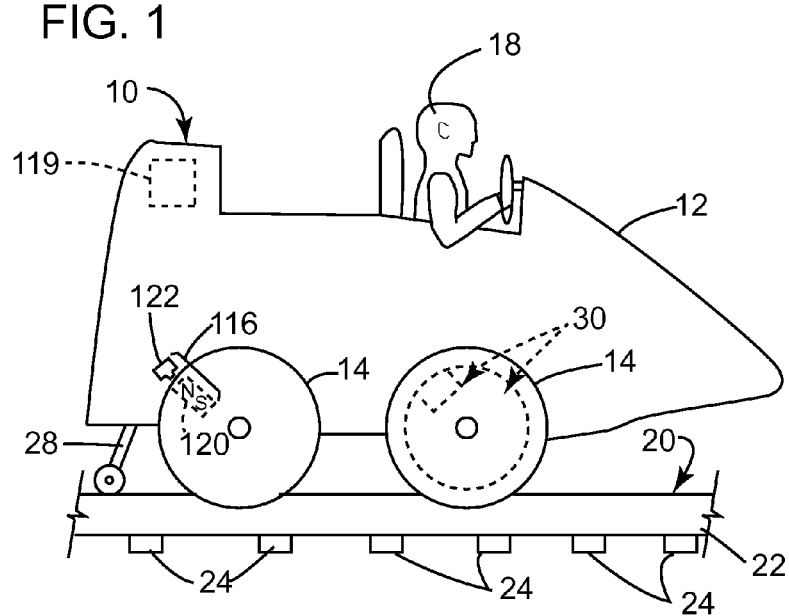
FIG. 1 is a diagram showing one vehicle disposed on a portion of a path and wherein the vehicle includes a vehicle control system in accordance with one embodiment of the present invention.
Figure 2:
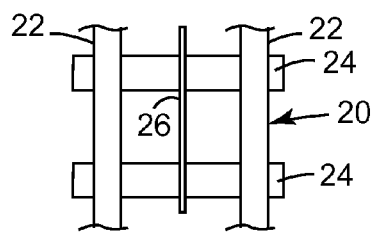
FIG. 2 is a diagram showing a top view of a portion of the path of FIG. 1.

Referring to FIGS. 1 and 2, one vehicle 10, out of a plurality of vehicles of a ride system, is shown with a body 12, wheels 14 along with a guest 18 seated therein. The vehicle 10 is disposed on a path such as a track 20 which includes rails 22 that are supported by cross beams 24. A bus bar or energizing rail 26 provides electrical energy from an electrical generator (described below) to the vehicle 10 through means of an electrode 28. A disc brake 30 is shown mounted to a wheel 14.

A distance/speed sensor 116 may comprise a magnet 120 and a magnetic field or optical sensor 122, which together function in a known manner to provide electrical pulses to a processor (not shown), which correspond to a distance traveled by wheel 14. A processor, memory, timer, distance and a driving and stopping system (each to be discussed further with reference to FIG. 3) may be located within compartment 119.

Figure 3:
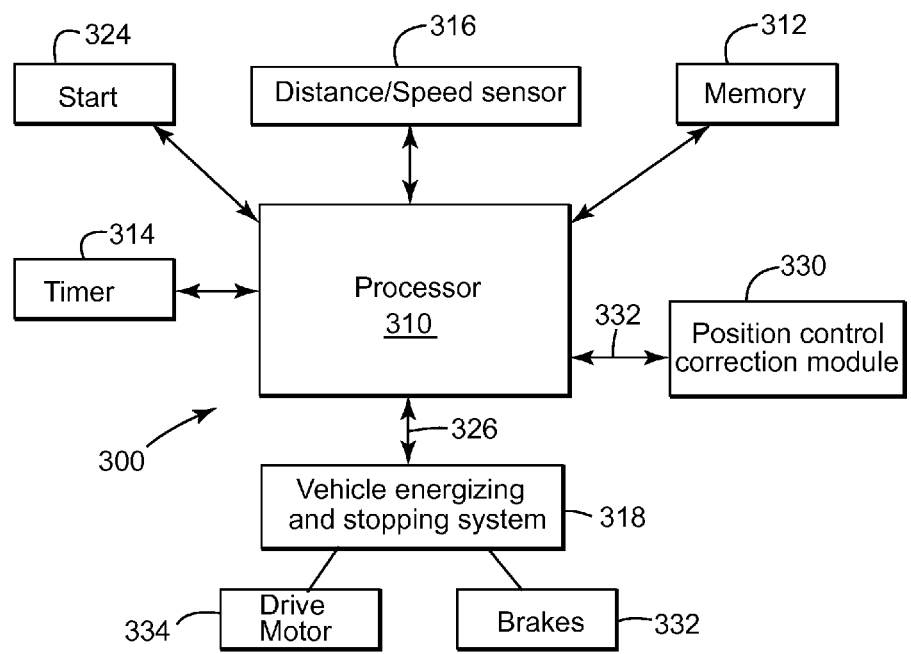
FIG. 3 is a block diagram showing details of the vehicle control system of FIG. 1.

Referring now to FIG. 3, one embodiment of a vehicle control system for controlling a plurality of vehicles on a fixed path in accordance with the present invention is illustrated generally at 300. In this embodiment, the control system 300 comprises a processor 310, a memory 312, a timer 314, a distance/speed sensor 316 and a vehicle driving and stopping system 318.

The processor 310 may be any suitable processor such as a programmable logic controller. The memory 312 may be any suitable type including but not limited to RAM, ROM, EPROM, and flash. The memory 312 may store a program for the processor 310 and store a look up table for a predicted range of locations given a duration that a vehicle is traveling along the track. The memory may also be configured to store wheel diameter measurement, horizontal wheel slip measurements and vehicle spacing measurement, e.g., how far each vehicle is from a corresponding vehicle at any particular time.

The timer 314 provides a timing function that may be used by the processor 310 to time an actual duration that the vehicle is traveling along the track.

The distance/speed sensor 316 may comprise a magnet and a magnetic field or optical sensor which together function in a known manner to provide electrical pulses to the processor 310 which correspond to a distance traveled by the wheel. Optionally, other sensors such as a multi-turn encoder may be employed. To determine the distance, the pulses may be counted or directly measured by the processor 310 to determine a distance and, therefrom, a location of the vehicle along the track.

The vehicle driving and stopping system 318 may be interconnected with a drive motor 334 including a motor controller (not shown) and a brake 332 such as the disc brake 30 (FIG. 1). The drive motor 334 may be connected to drive one or more of the wheels 14 (FIG. 1) via velocity commands generated by the processor 310 and sent to the motor controller in a known manner. It will be understood for purposes herein that the greater the magnitude of the velocity command the greater the velocity of the vehicle.

The processor 310 is configured, via any suitable means such as software or firmware, to receive an initial signal from a start indicator 324 that the vehicle has started traveling along the track and thereafter, to continuously, or at regular intervals, calculate an actual location for the vehicle along the track. Optionally, transponders (not shown) may be located along the track and a sensor may be provided for ascertaining an actual location for the vehicle.

The calculated actual location may be used by the processor 310 to control, via the vehicle driving and stopping system 318, the distance between a plurality of vehicles so that vehicles maintain a predetermined spacing from one another. However, position errors may accumulate during operation because of, e.g., vehicle wheel wear or wheel slippage. For example, as the vehicle increases in age, tires may begin to wear and become smaller, velocity and position errors may accumulate. Also, when vehicles start out or round corners wheel slippage may occur causing further velocity and position errors. To reduce these errors, a position control correction module 330 is provided which may be configured to receive velocity commands from the processor 310, and return a signal to the processor correcting the velocity commands based on velocity and position errors. Accordingly, the position control correction module 330 advantageously reduces variation in predetermined distance between vehicles to reduce undesirable vehicle contact.

To compensate for wheel wear, the position control correction module 330 working with the processor 310, may be configured to calculate a distance between fixed points, e.g., illuminated by transponders, that are located along a path and identified by additional vehicle position sensors and then compare that value with a known number of wheel revolutions sensed, e.g., by the sensor 116. Current wheel diameter may be calculated and then applied to correct the measured velocity and acceleration.

Generally, to compensate for wheel slip, e.g., during acceleration, the position control correction module 330 may compare a velocity command ($V_N$), described above, to an actual velocity that the vehicle is traveling along the fixed path. If there is a difference between the velocity of the vehicle expected from the velocity command and the actual velocity of the vehicle, the velocity command may be reduced in magnitude such as to the actual velocity to eliminate the slippage and regain frictional engagement with the fixed path. Thereafter, the velocity commands may be slowly ramped up in magnitude, described below, to thereby retain frictional engagement with the fixed path.

Figure 4:
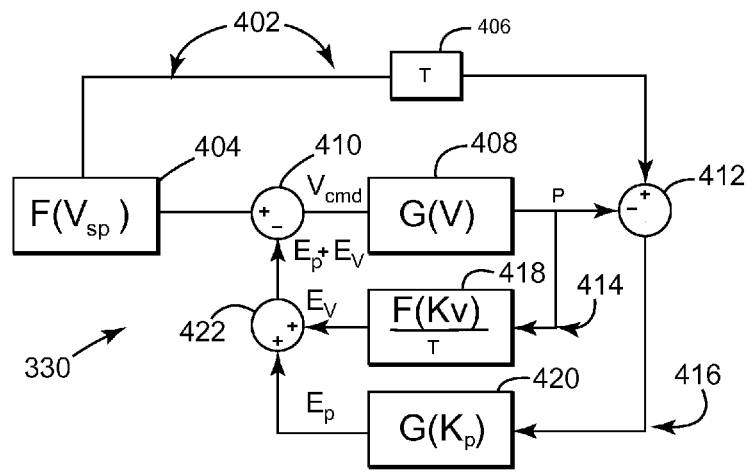
FIG. 4 is a flow diagram showing an embodiment of a position control correction module.

Referring now to the flow diagram of FIG. 4, further details of a position control correction module 330 for calculating corrected velocity commands, is shown. The position control correction module 330 comprises a primary loop 402 including calculator 404 for calculating a smoothed transition speed (see below), a timer 406, a speed control function 408, a summation 410 and a summation 412. Secondary loops 414 and 416 are provided for calculating error in velocity and error in position, respectively. More specifically, the secondary loop 414 comprises a calculator for calculating error in velocity ($E_v$) via $F(K_v)/T$ and the secondary loop 416 comprises a calculator for calculating error in position ($E_p$) via $F(K_p)$. Reference may be had below for an understanding of the terms $F(K_v)$ and $F(K_p)$. The secondary loops 414 and 416 contain gain functions 418 and 420 to calculate and weigh the position and velocity errors for the summation 422.

In operation and during regular intervals, a summation 422 combines calculated velocity and position errors ($E_v$), ($E_p$) which are, in turn, fed to the summation 410 that subtracts the error values from the velocity at a particular sensed position ($V_{sp}$) to achieve a corrected velocity G(v). The corrected velocity G(v) and the actual velocity (not shown) may be provided at 408 and communicated to the processor 310 (FIG. 3) for use in determining whether slippage of the wheel(s) 30 is occurring. If wheel slippage is determined to be occurring by the processor 310, the processor may reduce the magnitude of the velocity commands to the motor to stop the slippage and then to begin to slowly ramp up the magnitude of the velocity commands to the drive motor as described above.

The corrected velocity G(v) is thereafter output to the secondary loop 414 to calculate a new error in velocity ($E_v$) and combined with the output from the timer 406 for use in the secondary loop 416 to calculate a new error in position ($E_p$). It is also communicated to the processor 310 to determine whether velocity needs to be increased to correct an error in position and thus spacing between vehicles.

Optionally, to smooth and slowly ramp up vehicle transition speeds $F(V_{sp})$ and prevent the error from accumulating in the system, the vehicle velocity commands ($V_N$) may be applied to an algorithm such as that provided below.

$$F(V_{sp}) = \Sigma [\theta^{-2\pi\lambda} \cdot \pi (\cos(\theta)+1) \cdot [\frac{1}{2} \cdot (V_{Nnew} - V_{Nold})]]$$
where:

$\theta = \theta + \lambda$, where $\lambda = F(a)/\pi$ if $V_{Nold} \neq V_{Nnew}$, $\theta = \pi$ $V_N$=velocity command The acceleration function F(a) of a vehicle may be calculated from the following equation where acceleration is limited by a percentage of the change in velocity to further reduce possible slip during acceleration.

$$F(a) = a_N \cdot [(V_N - V_{actual})/V_N]\%$$

where:

$V_{actual} = F(V_{sp})(V_N)$ $a_N$=acceleration command

A function of a gain term (K) for (used in calculating an error in velocity ($E_v$) and an error in position ($E_p$) see above)

velocity $K_v$ and position $K_p$ weigh the respective terms so that speed correction is smooth. These may be calculated as follows:

$$F(K_{v,p}) = K_{v,p} \cdot K_{v,p} \cdot K_{wheel\, \varnothing},$$

$$K_{wheel\, \varnothing} = 1 - [(actual - measured)/actual]\%$$

If $E_v >> \varnothing$, $\theta = \pi$, $F(a) = F(a) \cdot K_{correction}$

Figure 5:
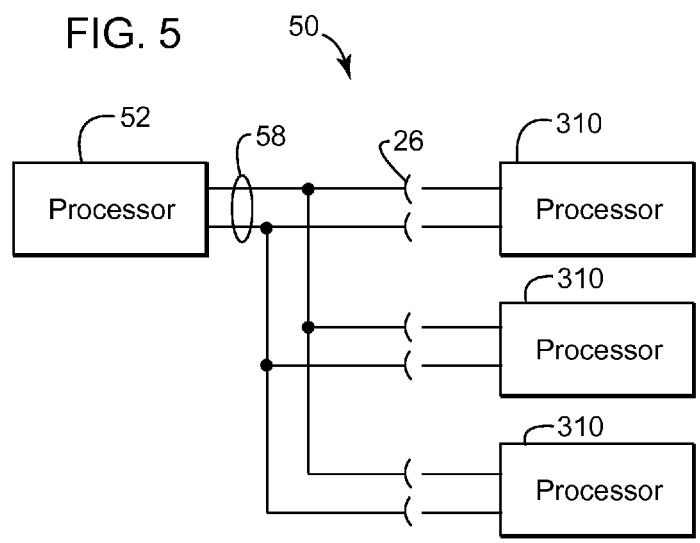
FIG. 5 is a schematic diagram showing an amusement ride control system.

Referring now to FIG. 5, a schematic diagram showing a ride control system, usable with one embodiment of the present invention, is shown generally at 50. As shown, the ride control system 50 comprises a path or track processor 52 which is in circuit with the energizing rail 26 comprising a number of circuit connections (not numbered) and a plurality of vehicle 310 (FIG. 3) each being located with a vehicle 10 (FIG. 1). It will be appreciated that in an optional embodiment (not shown), the track processor 52 may communicate via wireless communications with each vehicle processor 310 rather than, e.g., via the energizing rail 26. The track processor 52 may comprise a programmable logic controller and monitors track functions such as mode of the track machine, stopping and starting functions, and control of all track-switching elements via fail-safe signals. The track processor 52 and each vehicle processor 310 may communicate to ensure the mode of the track machine is safely controlled for the all vehicles mounted to the track. If there is disagreement of the mode of the track or if the vehicle senses itself out of range for position, velocity, or acceleration parameters or other fault conditions, the vehicle will communicate to the track processor and/or other vehicle processors to cause a stop or other reaction for each vehicle 10.

The track processor 52 may also be configured to determine and broadcast an ideal location of each vehicle to each vehicle on the path according to some predetermined plan such as every vehicle is spaced equally along the path. Each vehicle, via each processor 310, may then synchronize or vary its position along the path by increasing velocity or braking, as described above, to correct its spacing from other vehicles.

Figure 6:
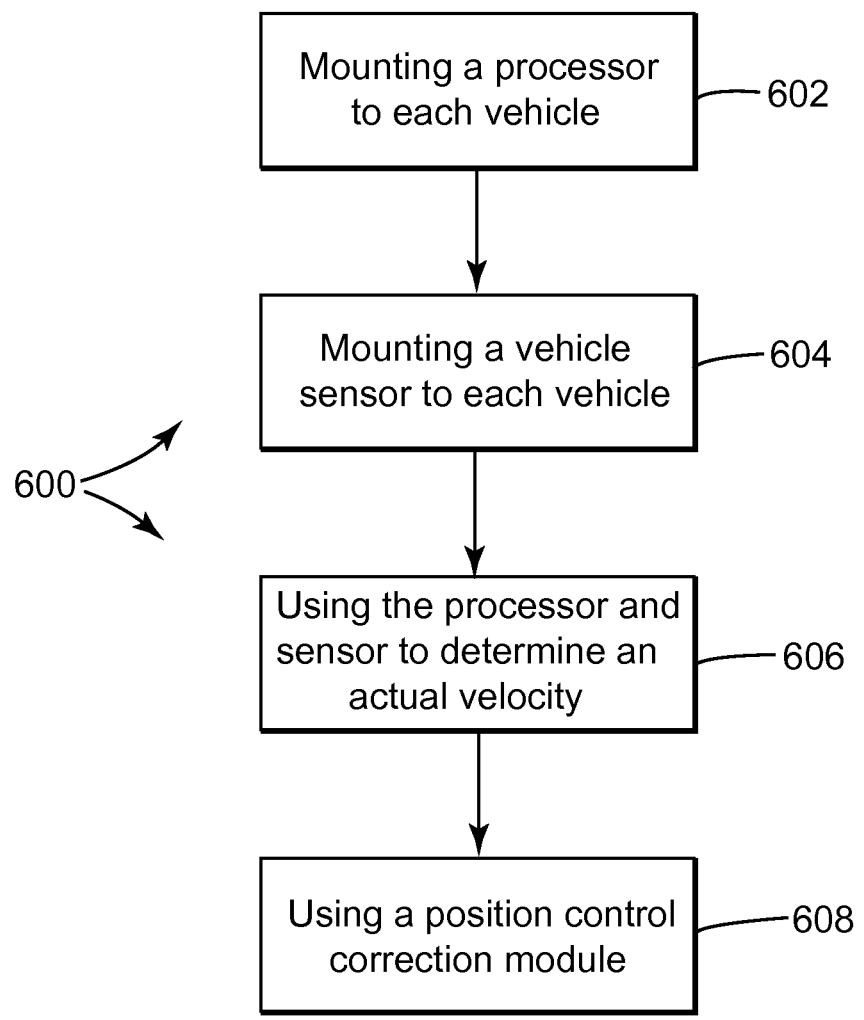
FIG. 6 is a flow chart describing a step-wise method in accordance with an embodiment of the present invention.

A method of monitoring and controlling location of a plurality of vehicles movable along a path in accordance with another embodiment of the present invention is illustrated generally at 600 in FIG. 6. The method for controlling a plurality of vehicles on a fixed path comprises mounting a processor to each vehicle as shown at 602 and mounting a vehicle sensor device to each vehicle as shown at 604. The method further comprises using each processor and each vehicle sensor device to determine an actual location of each vehicle while each vehicle is moving along the path step 606 and, at step 608, using a position control correction module to compare each vehicle's actual velocity to each vehicle's velocity commands to determine if wheel slip is occurring and to decrease the magnitude of vehicle velocity commands where wheel slip occurs.

Technical effects of the herein described systems and methods include correcting a velocity of a vehicle to account for wheel slip. Other technical effects include correcting a vehicle spacing on a track.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A method for controlling a vehicle having wheels located on a fixed path, the method comprising:
   using a vehicle processor and a vehicle sensor device to determine an actual velocity of the vehicle while the vehicle is moving along the path, wherein the vehicle processor and the vehicle sensor device are located on the vehicle;
   using a position control correction module to compare the actual velocity of the vehicle to a velocity command generated by the vehicle processor and utilizing a comparison result to determine if wheel slip is occurring; and
   decreasing a magnitude of a subsequent vehicle velocity command from the vehicle processor relative to a magnitude of the velocity command where the comparison result indicates that wheel slip is occurring.

2. The method of claim 1, comprising using the position control correction module to ramp up the magnitude of vehicle velocity commands after wheel slip is determined to have been eliminated based on a subsequent comparison of the actual velocity to the velocity command.

3. The method of claim 1, comprising using the position control correction module to compensate for changes in vehicle velocity because of wheel deterioration by calculating a current wheel diameter and correcting the determined actual velocity based upon the calculated current wheel diameter.

4. The method of claim 1, comprising using the position control correction module to perform an algorithm to gradually ramp up vehicle transition speeds subsequent to decreasing the actual velocity.

5. The method of claim 4, comprising using the position control correction module to correct velocity error accumulation.

6. The method of claim 4, comprising applying the following as the algorithm:

$$F(Vsp) = \Sigma [^{\theta 2\pi,\lambda}_{\pi}(\cos(\theta)+1) \odot [\tfrac{1}{2}] \odot (V_{Nnew} - V_{Nold})]$$

where:

$F(Vsp)$ = vehicle transition speeds $\theta = \theta + \lambda$, where $\lambda = F(a)/\pi$ if $V_{Nold} \neq V_{Nnew}$, $\theta = \pi$ $V_N$ = velocity command $F(a) = a_N \odot [(V_N - V_{actual})/V_N]\%$ where:

$V_{actual} = F(Vsp)(V_N)$ $a_N$ = acceleration command.

7. A ride control system for controlling a plurality of vehicles on a path, the ride control system comprising:
   a path processor configured to communicate an ideal spacing between each vehicle of the plurality of vehicles on the path;
   a plurality of vehicle processors, wherein each of the plurality of vehicles includes a one of the plurality of vehicle processors, and wherein each of the plurality of vehicle processors is configured to receive the ideal spacing;
   wherein each of the plurality of vehicle processors is in circuit with a corresponding vehicle sensor device configured to identify an actual velocity of a corresponding one of the plurality of vehicles;

a timer configured to provide time duration of travel data for one or more of the plurality of vehicles along the path a plurality of position control correction modules, wherein each of the plurality of vehicles includes a one of the plurality of position control correction modules, and wherein each of the plurality of position control correction modules is configured to determine a variation in an expected position of the corresponding vehicle by comparing the actual velocity of the corresponding vehicle with a velocity command of the corresponding vehicle, in view of time duration of travel data for the corresponding vehicle from the timer, and to determine a corrected velocity that will correct the variation in the expected position of the corresponding vehicle such that the ideal spacing will be corrected without requiring knowledge of a position of adjacent vehicles; and a plurality of vehicle driving and stopping systems, wherein each of the plurality of vehicles includes a one of the plurality of vehicle driving and stopping systems in circuit with a corresponding one of the plurality of vehicle processors, and wherein each of the plurality of vehicle driving and stopping systems is configured to apply the corrected velocity to the corresponding vehicle to correct for the variation in spacing between the adjacent vehicles.

8. The system of claim 7, wherein each of the position control correction modules is configured to identify and compensate for changes in vehicle spacing caused by wheel slip along the fixed path.

9. The system of claim 7, wherein each of the plurality of the position control correction modules is further applied to compensate for variations in vehicle spacing caused by wheel deterioration by calculating a current wheel diameter and correcting the identified actual velocity based upon the calculated current wheel diameter.

10. The system of claim 7, wherein the position control correction module is configured to employ an algorithm to gradually transition velocity commands to the corrected velocity and prevent position errors from accumulating.

11. The system of claim 10, wherein the algorithm to gradually transition velocity commands comprises:

$$F(Vsp) = \Sigma[{}^{\theta 2\pi,\lambda}{}_{\pi}(\cos(\theta)+1) \odot [½] \odot (V_{Nnew} - V_{Nold})]$$
where:

$F(Vsp)$=vehicle transition speeds $\theta = \theta + \lambda$, where $\lambda = F(a)/\pi$ if $V_{Nold} \neq V_{Nnew}$, $\theta = \pi$ $V_N$=velocity command $F(a) = a_N \odot [(V_N - V_{actual})/V_N]\%$ where:

$V_{actual} = F(Vsp)(V_N)$ $a_N$=acceleration command.

12. A method for determining slippage of at least one wheel of at least one vehicle having a motor and a processor that communicates velocity commands to the motor for varying a velocity of the vehicle, the method comprising:

determining an actual velocity of the vehicle with a velocity sensor;

comparing, with a processor, the actual velocity of the vehicle to an expected velocity based on a magnitude of the velocity commands;

determining, with the processor, whether there is slip of the at least one wheel of the at least one vehicle based upon the comparison of the actual velocity and the expected velocity; and reducing the magnitude of the velocity commands to equal approximately the actual velocity of the vehicle where a determination is made that there is slip of the at least one wheel.

13. The method of claim 12, wherein reducing the magnitude of the velocity commands comprises applying the velocity commands to an algorithm that smoothes the reduction of the magnitude of the velocity commands.

14. The method of claim 13, wherein the algorithm comprises:

$$F(Vsp) = \Sigma[{}^{\theta 2\pi,\lambda}{}_{\pi}(\cos(\theta)+1) \odot [½] \odot (V_{Nnew} - V_{Nold})]$$
where:

$F(Vsp)$=vehicle transition speeds $\theta = \theta + \lambda$, where $\lambda = F(a)/\pi$ if $V_{Nold} \neq V_{Nnew}$, $\theta = \pi$ $V_N$=velocity command $F(a) = a_N \odot [(V_N - V_{actual})/V_N]\%$ where:

$V_{actual} = F(Vsp)(V_N)$ $a_N$=acceleration command.

15. The method of claim 12, comprising ramping up the magnitude of the velocity commands once no wheel slip occurs.

\* \* \* \* \*